United States Patent
Zhang et al.

(10) Patent No.: US 12,507,005 B2
(45) Date of Patent: Dec. 23, 2025

(54) ELEVATING ACOUSTIC HOWLING SUPPRESSION VIA RECURSIVE NEURAL NETWORK TRAINING

(71) Applicant: TENCENT AMERICA LLC, Palo Alto, CA (US)

(72) Inventors: Hao Zhang, Palo Alto, CA (US); Meng Yu, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 251 days.

(21) Appl. No.: 18/486,436

(22) Filed: Oct. 13, 2023

(65) Prior Publication Data

US 2025/0126406 A1   Apr. 17, 2025

(51) Int. Cl.
 *H04R 3/02* (2006.01)
 *G06N 3/044* (2023.01)
 *G06N 3/09* (2023.01)

(52) U.S. Cl.
 CPC ............... *H04R 3/02* (2013.01); *G06N 3/044* (2023.01); *G06N 3/09* (2023.01)

(58) Field of Classification Search
 CPC ............. H04R 3/02; G06N 3/044; G06N 3/09
 USPC ......................................... 381/93, 83, 95, 96
 See application file for complete search history.

(56) References Cited

U.S. PATENT DOCUMENTS

| | | | |
|---|---|---|---|
| 5,806,025 A * | 9/1998 | Vis ...................... | G10L 21/0208 704/226 |
| 10,672,414 B2 * | 6/2020 | Tashev ................... | G06N 3/045 |
| 11,250,833 B1 | 2/2022 | Bajic et al. | |
| 2023/0046518 A1 | 2/2023 | Gao et al. | |

OTHER PUBLICATIONS

Zhang et al., "Advanced Acoustic Howling Suppression Through Recursive Training of Neural Networks", arXiv.2309.16048v1 [eess.AS], Sep. 27, 2023; https://arxiv.org/abs/2309.16048><DOI:10.48550/arxiv.2309.16048>.
International Search Report received in International Application No. PCT/US2024/24075 mailed Jul. 23, 2024.
Written Opinion received in International Application No. PCT/US2024/024075 mailed Jul. 23, 2024.

* cited by examiner

*Primary Examiner* — Thjuan K Addy
(74) *Attorney, Agent, or Firm* — Sughrue Mion, PLLC

(57) ABSTRACT

A method and apparatus comprising computer code configured to cause a processor or processors to receive an audio signal obtained from a microphone, input the audio signal into a neural-network based AHS model, train the neural-network based AHS model based on input signals which are recursively generated from the audio signal during training of the AHS model, and output an AHS signal from the neural-network based AHS model in which AHS is applied to the audio signal, wherein the AHS signal is a version of the audio signal in which acoustic howling noise of the audio signal is suppressed and target audio of the audio signal is sustained.

20 Claims, 15 Drawing Sheets

FIG. 9

Algorithm Streaming inference process.

procedure STREAMING$((y, r) \rightarrow \hat{s})$   ▷ $r$: reference signal
 Initialization: $y_{\text{buffer}}$, $r_{\text{buffer}}$, load DNN model: $f(\cdot)$
 Parameters: Delay: $\Delta t$, gain: $G$, nonlinearity: $NL(\cdot)$
 while $m \leq M$ do   ▷ $M$ is the total number of frames
  $\hat{s}_m \leftarrow f(y_{\text{buffer}}, r_{\text{buffer}})$   ▷ Get output at frame $m$
  $\hat{s} \leftarrow \hat{s}_m$   ▷ Save to final output
  $x_{m+1} \leftarrow \text{Delayed}.\hat{s}_m \cdot G$   ▷ Get loudspeaker signal
  $d_{m+1} \leftarrow NL(x_{m+1}) * h$   ▷ Get next playback
  $y_{\text{buffer}} \leftarrow d_{m+1} + s_{m+1} + n_{m+1}$   ▷ Update input
  $r_{\text{buffer}} \leftarrow y_{\text{buffer}}$   ▷ Update reference signal
 end while
 return $\hat{s}$   ▷ The streaming output is $\hat{s}$
end procedure

| Algorithm Recursive training of NN for AHS. |
|---|
| procedure STREAMING$((Y, R) \to \hat{S})$    ▷ R: reference signal |
|    Randomly initialize or load pre-trained NN model: $NN(\cdot)$ |
|    Randomly generate: $\Delta t, G$ |
|    while $m \leq M$ do    ▷ $M$ is the total number of frames |
|      $\hat{S}_m \leftarrow NN(Y_m, R_m)$    ▷ Output at frame $m$ |
|      $X_m \leftarrow$ Delayed $\hat{S}_m \cdot G$ |
|      $Y_{m+1} \leftarrow S_{m+1} + X_m \cdot H$    ▷ Update mic. signal |
|      if Hybrid method then |
|        $\hat{D}_{m+1} \leftarrow \mathbb{K}(Y_{m+1}, X_m)$    ▷ $\mathbb{K}(\cdot)$: Kalman |
|        $R_{m+1} \leftarrow E_{m+1} = Y_{m+1} - \hat{D}_{m+1}$    ▷ Update ref. signal |
|      else (NN only method) |
|        $R_{m+1} \leftarrow X_m$ |
|      end if |
|      $\hat{S} \leftarrow \hat{S}_m$    ▷ Save processed frame to final output |
|    end while |
|    $Loss \leftarrow (S, \hat{S})$    ▷ Get loss |
|    $NN(\cdot) \leftarrow Loss$    ▷ Update DNN parameters |
| end procedure |

1400

ELEVATING ACOUSTIC HOWLING SUPPRESSION VIA RECURSIVE NEURAL NETWORK TRAINING

BACKGROUND

1. Field

The present disclosure is directed a set of advanced audio technologies acoustic howling suppression (AHS).

2. Description of Related Art

Acoustic howling has become a crucial problem in video/audio conference and acoustic amplification systems.

Howling may arise due to the coupling between a microphone and a loudspeaker such as when there exists positive feedback therebetween. Specifically, the microphone signal from a microphone in an audio system may be played out through a loudspeaker that is exposed in a same space and then picked up again by the same microphone, forming a closed acoustic loop.

If not properly handled, this playback signal may be looped back repeatedly and result in a shrill sound at frequencies that have unity or larger loop gain. This phenomenon is known as howling.

Howling is a crucial problem for video/audio conferences and acoustic amplification systems such as hearing aids and karaoke. It is not only harmful to our auditory system but also destructive to the amplification equipment. Therefore, howling mitigation has become a crucial problem in video/audio conference, hearing aids, karaoke and other acoustic amplification systems.

Many AHS solutions have been proposed to address this problem, including gain control, notch filter (NF), and adaptive feedback cancellation (AFC). The gain reduction method can be achieved by either manually reducing the volume of an amplifier or altering the position of audio devices. However, such methods are with restricted applications and unsuitable in scenarios that require high acoustic amplification. The NF methods attenuate howling by adjusting their filter coefficients to form a null at frequencies where howling appears. However, the NF methods require accurate detection of howling and inherently distort the target sound and even introduce unexpected howling frequencies. AFC attenuates howling by estimating the acoustic path between the loudspeaker and microphone using adaptive filters. Because the target signal and playback signal are highly correlated, de-correlation techniques may be usually required in AFC methods, which, however, inevitably distorts speech quality.

And for any of those reasons there is therefore a desire for technical solutions to such problems that arose in computer audio technology.

SUMMARY

There is included a method and apparatus comprising memory configured to store computer program code and a processor or processors configured to access the computer program code and operate as instructed by the computer program code. The computer program is configured to cause the processor implement receiving code configured to cause the at least one processor to receive an audio signal obtained from a microphone; inputting code configured to cause the at least one processor to input the audio signal into a neural-network based AHS model; training code configured to cause the at least one processor to train the neural-network based AHS model based on input signals which are recursively generated from the audio signal during training of the AHS model; and outputting code configured to cause the at least one processor to output an AHS signal from the neural-network based AHS model in which AHS is applied to the audio signal, wherein the AHS signal is a version of the audio signal in which acoustic howling noise of the audio signal is suppressed and target audio of the audio signal is sustained.

According to exemplary embodiments, training the neural-network based AHS model may include: obtaining the audio signal as a frequency-domain microphone signal; obtaining a reference signal; and estimating a target signal based on the audio signal and the reference signal.

According to exemplary embodiments, the reference signal may be an output of a Kalman filter.

According to exemplary embodiments, training the neural-network based AHS model may include generating the output of the Kalman filter during the training of the neural-network based model.

According to exemplary embodiments, at least one of the input signals may be based on an output of training the neural-network based AHS model based on a previous frame of the audio signal, and training the neural-network based AHS model may include training the neural-network based AHS model based on a combination of a current frame of the audio signal and the at least one of the input signals.

According to exemplary embodiments, a frame size of each of the previous frame and the current frame may be 8 ms of the audio signal.

According to exemplary embodiments, at least one of the input signals may include a combination of an output of a Kalman filter with a current frame of the audio signal, and the output of the Kalman filter may be generated during training of the neural-network based AHS model.

According to exemplary embodiments, the output of the Kalman filter may be generated based on an output of the neural-network based AHS model depending on a previous frame of the audio signal, and the previous frame may be previous to the current frame.

According to exemplary embodiments, training the neural-network based AHS model may further include a second output of the neural-network based AHS model, being output from the neural-network based AHS model depending on the at least one of the input signals, being fed back to the Kalman filter, combined with at least a next frame of the audio signal, and fed back to the neural-network based AHS model.

According to exemplary embodiments, training the neural-network based AHS model may include updating the neural-network based AHS model using an utterance-level mean absolute error (MAE) of real and imaginary spectrograms as loss function.

BRIEF DESCRIPTION OF THE DRAWINGS

Further features, nature, and various advantages of the disclosed subject matter will be more apparent from the following detailed description and the accompanying drawings in which:

FIG. 9 is a simplified illustration in accordance with embodiments;

FIG. 14 is a simplified illustration in accordance with embodiments; and

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
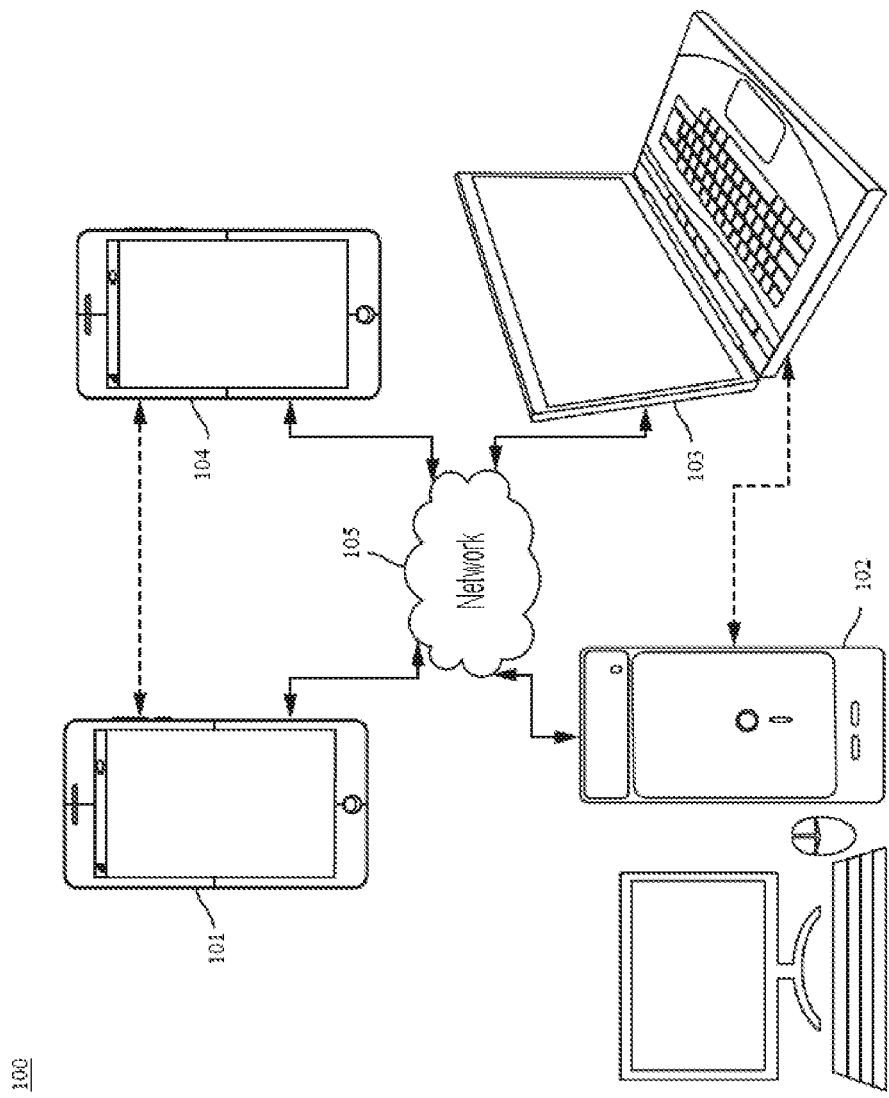
FIG. 1 is a schematic illustration of a diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
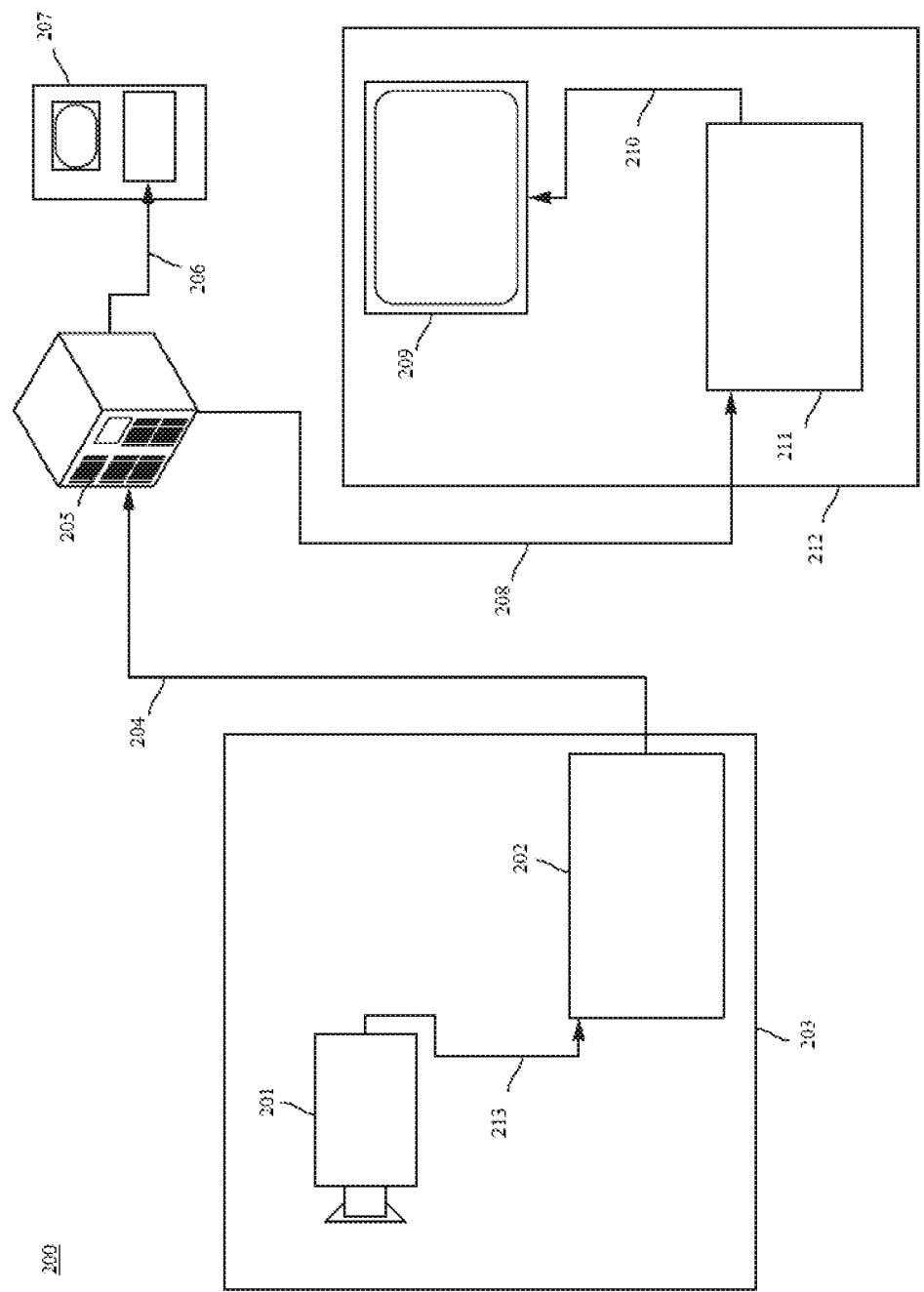
FIG. 2 is a simplified block diagram in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
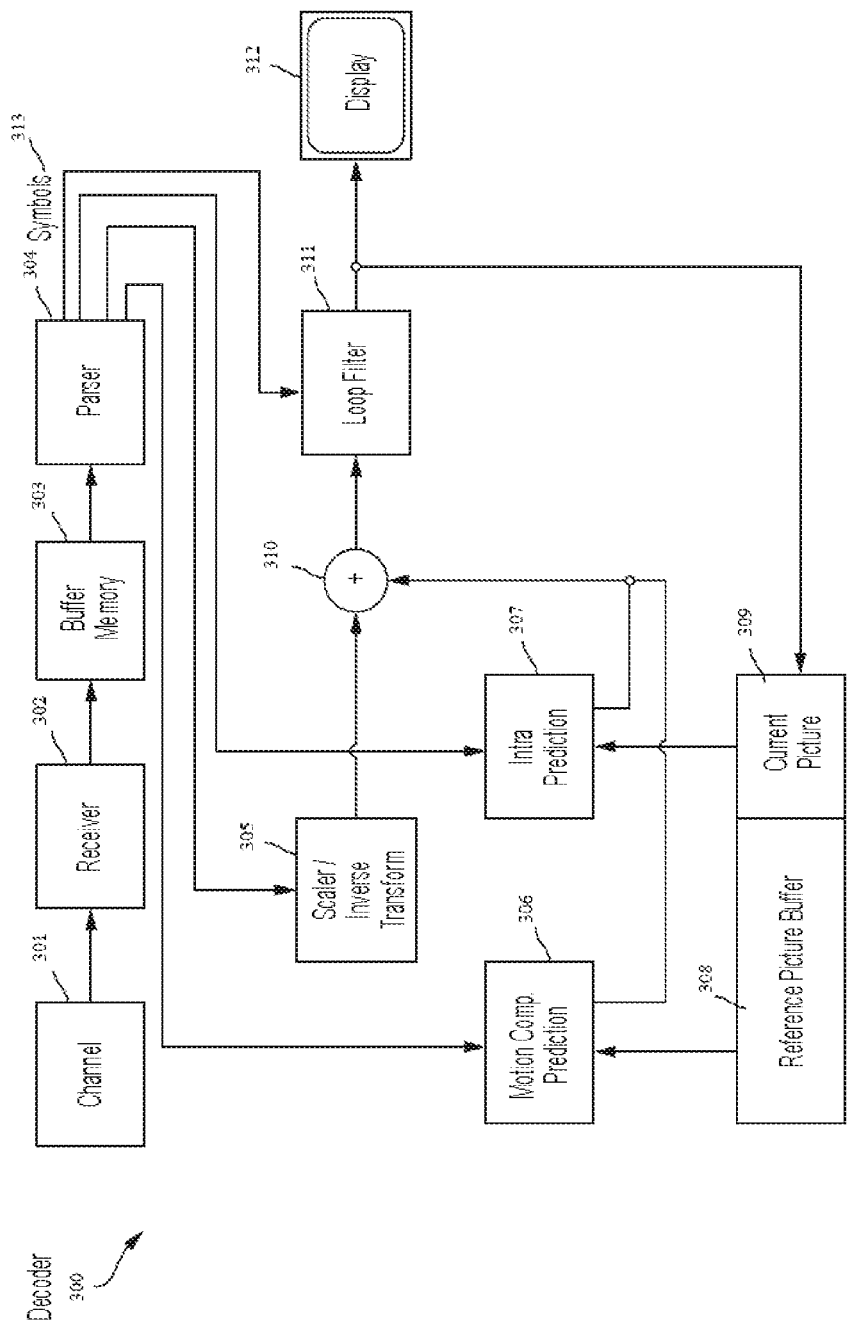
FIG. 3 is a simplified illustration in accordance with embodiments.

FIG. 3 may be a functional block diagram of a video decoder 300 according to an embodiment of the present disclosure.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosynchronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Embodiments herein may be applied in such environments, such as 2 or more dimensional video conferencing, or hearing aids or karaoke environments or theatre environments or the like that may experience acoustic howling.

For example, the ultimate goal of howling suppression is to attenuate the playback signal and send only the target signal to the loudspeaker, which, in that sense, is similar to embodiments that regard acoustic echo cancellation (AEC).

Considering that deep learning is powerful at modeling complex nonlinear relationships and has been successfully introduced to suppress acoustic echo, embodiments herein employ deep learning to also serve as a powerful alternative to address AHS problems such as prior inability of deep learning in treating howling as a type of noise for speech enhancement rather even if suppressing howling in a streaming and recurrent manner.

According to embodiments herein, aspects of what may be referred to as "Deep AHS" are utilized to address howling suppression. That is, AHS may be viewed herein as a supervised learning problem with the overall task to maintain only the target signal while suppressing the playback signal and background noise in a microphone recording. Considering that a playback signal and a target signal are highly correlated, embodiments herein may use a concatenation of temporal correlation ("corr."), frequency correlation, and channel covariance ("cov.") of input signals as feature and train an attention based recurrent neural network to estimate a complex ratio filter of the target signal.

In this disclosure, embodiments consider acoustic howling suppression (AHS) as a supervised learning problem and provide a deep learning approach, called Deep AHS, to address it. Deep AHS is trained in a teacher forcing way which converts the recurrent howling suppression process into an instantaneous speech separation process to simplify the problem and accelerate the model training. Ones of the disclosed embodiments utilize trained or training of an attention based recurrent neural network to extract the target signal from the microphone recording, thus attenuating the playback signal that may lead to howling. Different training strategies are utilized for one or more embodiments and a streaming inference method implemented in a recurrent mode used to evaluate the performance of the proposed method for real-time howling suppression. Deep AHS avoids howling detection and intrinsically prohibits howling from happening, allowing for more flexibility in the design of audio systems. Experimental results show the effectiveness of the disclosed embodiments for howling suppression under different scenarios.

Figure 4:
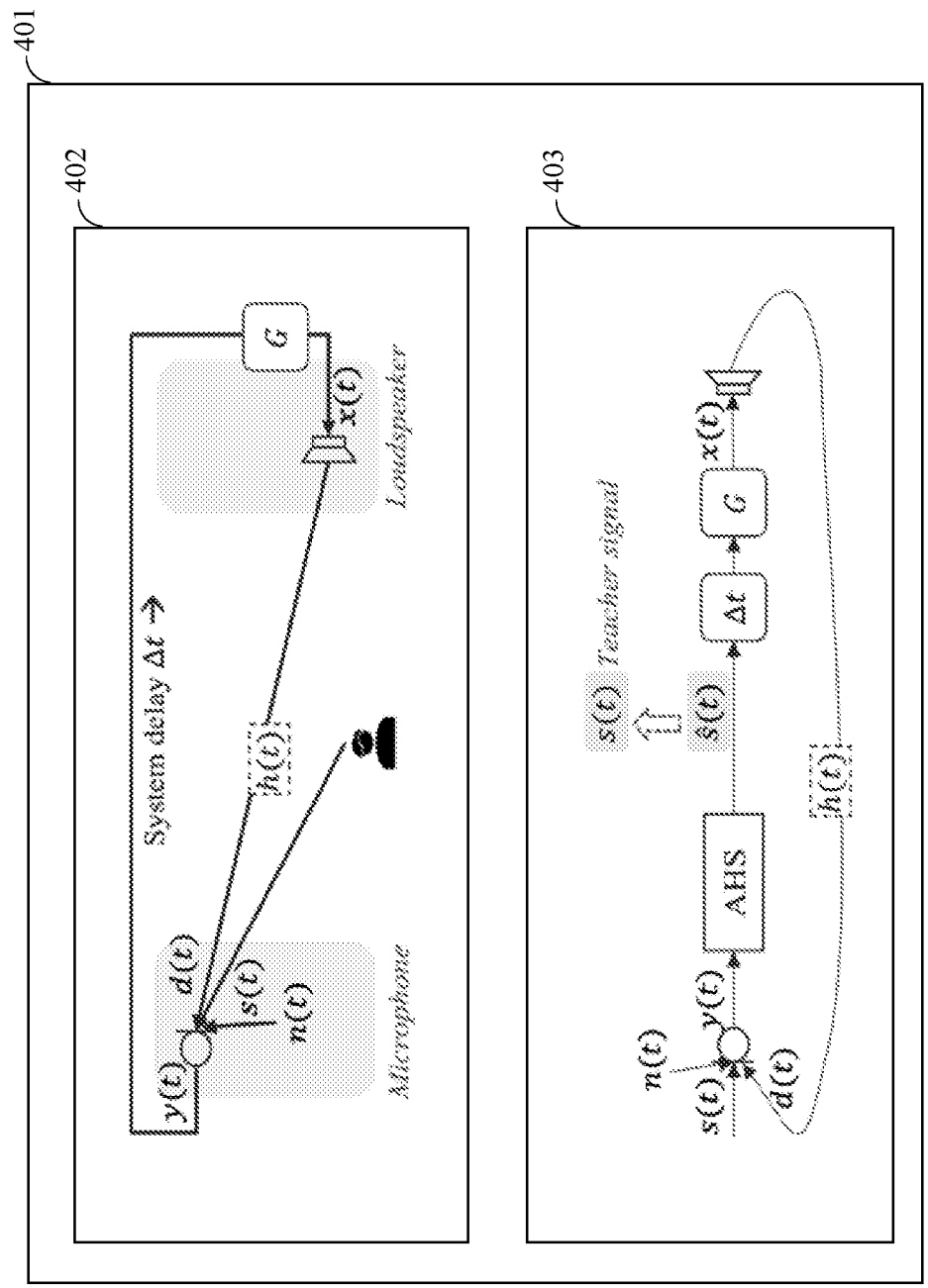
FIG. 4 is a simplified illustration in accordance with embodiments.

FIG. 4 illustrates an example 400 of a single-channel acoustic amplification system 401 with a microphone and a loudspeaker coupled in the same space 402. The target speech is picked up by the microphone as s(t), which is then sent to the loudspeaker for acoustic amplification. The loudspeaker signal x(t) is played out and arrives at the microphone as a playback signal denoted as d(t):

$$d(t) = NL(x(t)) * h(t) \qquad \text{Eq. (1)}$$

where NL(.) denotes the nonlinear distortion introduced by the loudspeaker, h(t) represents the acoustic path from loudspeaker to microphone, and * denotes linear convolution.

FIG. 4 also illustrates the signal flow 403 of an acoustic howling suppression system according to embodiments herein. For example, if without any processing, the loudspeaker signal x(t) will be a delayed and amplified version of y(t), and this playback signal d(t) will re-enter the pickup repeatedly, the corresponding microphone signal at time index t can be represented as:

$$y(t) = s(t) + n(t) + NL[y(t - \Delta t) \cdot G] * h(t) \qquad \text{Eq. (2)}$$

where n(t) represents the background noise, Δt denotes the system delay from microphone to loudspeaker, and G the gain of amplifier. The recursive relationship between y(t) and y(t−Δt) causes re-amplifying of playback signal and leads to a feedback loop that results in an annoying, high-pitched sound, which is known as acoustic howling.

With that being said, howling is generated in a recurrent manner rather than instantaneously. That is, howling starts as multiple playback signals and gradually forms a shrill sound after being amplified to a certain extent.

As a note acoustic howling is different from acoustic echo even though inappropriately handled acoustic echo (leakage) could also result in howling. Major differences between acoustic howling and acoustic echo include that both are essentially playback signals, while howling is generated gradually, and the playback signal that leads to howling is generated from the same source as that of the target signal whereas acoustic echo is usually generated from a different source (far-end speaker), which makes the suppression of howling more challenging.

Figure 5:
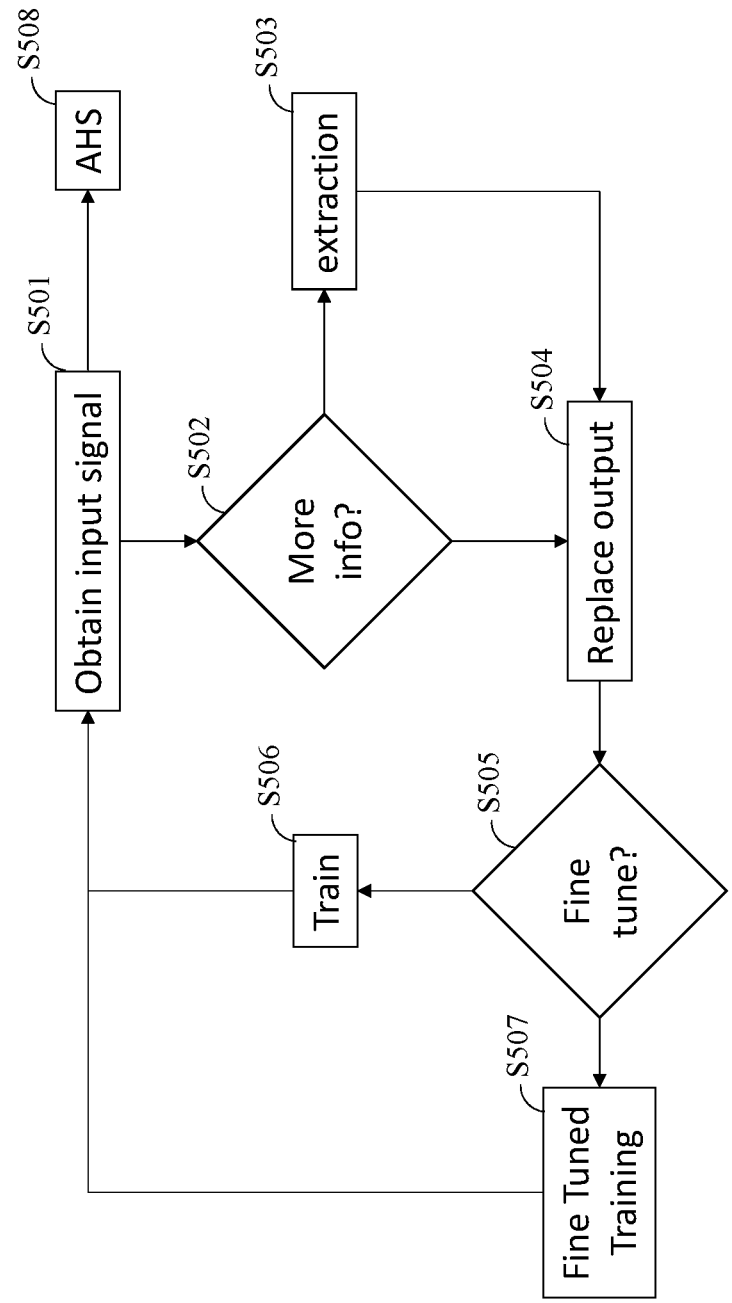
FIG. 5 is a simplified flow diagram in accordance with embodiments.

FIG. 5 represents an example flowchart 500 regarding an embodiment of teacher-forced learning for howling suppression. Ideally, if the AHS method can always perfectly process microphone recording and completely attenuates the playback component in it before sending it to the loudspeaker, there will be no howling problem under any circumstances. From the speech separation point of view, it seems that AHS can be seen as a speech separation problem where the target signal s(t) is a source to be separated from the microphone signal, which is similar to the idea of how deep learning based AEC is formulated.

However, to achieve howling suppression using deep learning considering the characteristics of acoustic howling, a most crucial problem is that howling is generated adaptively, and the current input depends on the previous outputs. Specifically, the existence of distortion/leakage in the current processed signal as shown in signal flow 403, will affect the playback signal received at the microphone in the next loop d(t+Δt). Ideally, there may be training of a deep learning model in an adaptive way by updating its parameters on a sample level. However, this requires a huge amount of computation and is hard to be realized in real applications.

As such, embodiments herein employ Deep AHS to train a model for howling suppression using teacher-forced learning. Assuming that once the model is properly trained, it should attenuate the playback signal in the microphone and send only target speech to the loudspeaker. During model training, embodiments take the target speech, s(t), as the teacher signal to replace the actual output ŝ(t) in the subsequent computation of the network, as shown in signal flow 403.

By using teacher forced learning, the playback signal d(t) is then a determined signal influenced only by s(t), and the repeating summation of multiple playback signals in Eq. (2) can be simplified to a one-time playback. The corresponding microphone signal for model training can be written as:

$$y(t) = s(t) + n(t) + NL[s(t - \Delta t) \cdot G] * h(t) \qquad \text{Eq. (3)}$$

The microphone signal during teacher forced learning is a mixture of the target signal, background noise, and a determined one-time playback signal. And the overall problem can thus be formulated as a speech separation problem. Training Deep AHS in a teacher-forced learning way not only simplifies the overall problem but also possible to diminish the uncertainty introduced in the adaptive process of AHS and results in a robust howling suppression solution.

According to exemplary embodiments, different training strategies have been explored according to embodiments herein. An example of a straightforward embodiment is to directly use the microphone signal in Eq. (3) as input at S501 and set the corresponding s(t) as the training target at S504. Such training strategy may be employed as the model trained at S506 without using a reference signal ("w/o Ref").

Another embodiment involves extracting more information at S502 from input and using that additional extracted information as a reference signal during model training. Therefore, embodiments use a delayed microphone signal as additional input at S503 with the amount of delay estimated during an initial stage. Considering that the playback signal can be regarded as a delayed, scaled, nonlinear version of s(t), using a delayed microphone signal helps the model to better differentiate the target signal from playback. Such embodiment of a training strategy may be referred to as "w Ref".

In addition, there may be situations where there is always a mismatch during offline training and real-time application considering the leakage existed in ŝ(t). To incorporate the mismatch and better approximate the real scenarios, embodiments employ another strategy that works by fine-tuning at S505 and S507 the model using pre-processing signals, denoted as "Fine-tuned". Then, the microphone signal for offline training is a modified version of Eq. (3):

$$y'(t) = s(t) + d'(t) + n(t) \qquad \text{Eq. (4)}$$

where d'(t) is the distorted playback signal generated using estimated target ŝ(t−Δt). To be specific, there may be pre-processing of all the training data using a pre-trained model and then the enhanced output may be fed through the audio system to get the corresponding playback d'(t). Finally, there may be fine-tuning of the model using y'(t) as input. As such, the mismatch mentioned previously would be reduced slightly given that the model has seen the distortion during training.

By any of the above-described embodiments, AHS may be achieved, to varying degrees, at S508 depending on one or more of those embodiments.

Figure 6:
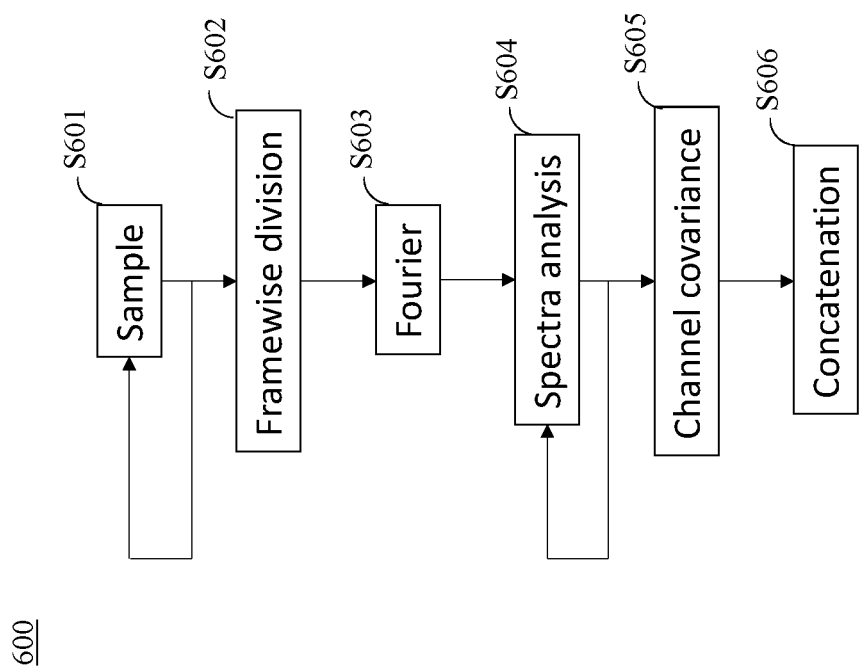
FIG. 6 is a simplified flow diagram in accordance with embodiments.
Figure 7:
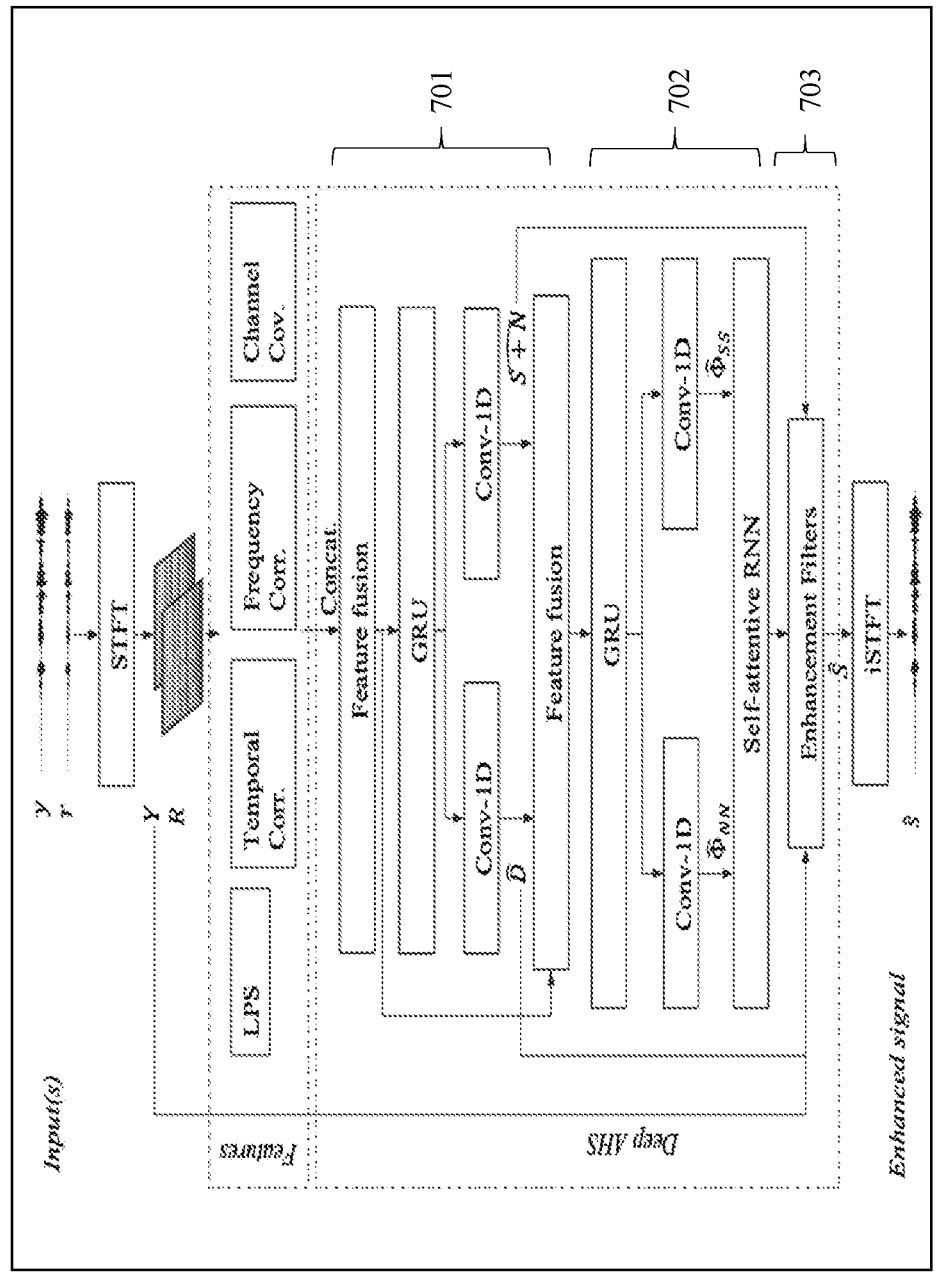
FIG. 7 is a simplified illustration in accordance with embodiments.

Details of a network structure are illustrated and described with the example 700 of FIG. 7 and the flowchart 600 of FIG. 6. The microphone signal y(t) and reference signal r(t), sampled at 16 k Hz at S601, are firstly divided into 32-ms frames with 16 ms frameshift at S602. A 512-point short-time Fourier transform (STFT) is then applied at S603 to each frame, resulting in the frequency domain inputs, Y(m, f) and R(m, f), with frame index m and frequency index f, respectively. Then a normalized log-power spectra (LPS) may be calculated at S604 along with a correlation matrix across time frames and frequency bins of microphone (log (|Y|²), $\Phi^T\_Y$, $\Phi^F\_Y$) and reference signals (log(|R|²), $\Phi^T\_R$, $\Phi^F\_R$), respectively, as input features. Where $\Phi^T\_*$ and $\Phi^F\_*$ are used to capture the signals' temporal and frequency dependency, which helps discriminate between howling and tonal components. Channel covariance of input signals $\Phi^C$ is calculated at S605 as another input feature to account for cross-correlation between them. A concatenation of these features is used at S606 for model training with a linear layer for feature fusion.

Figure 8:
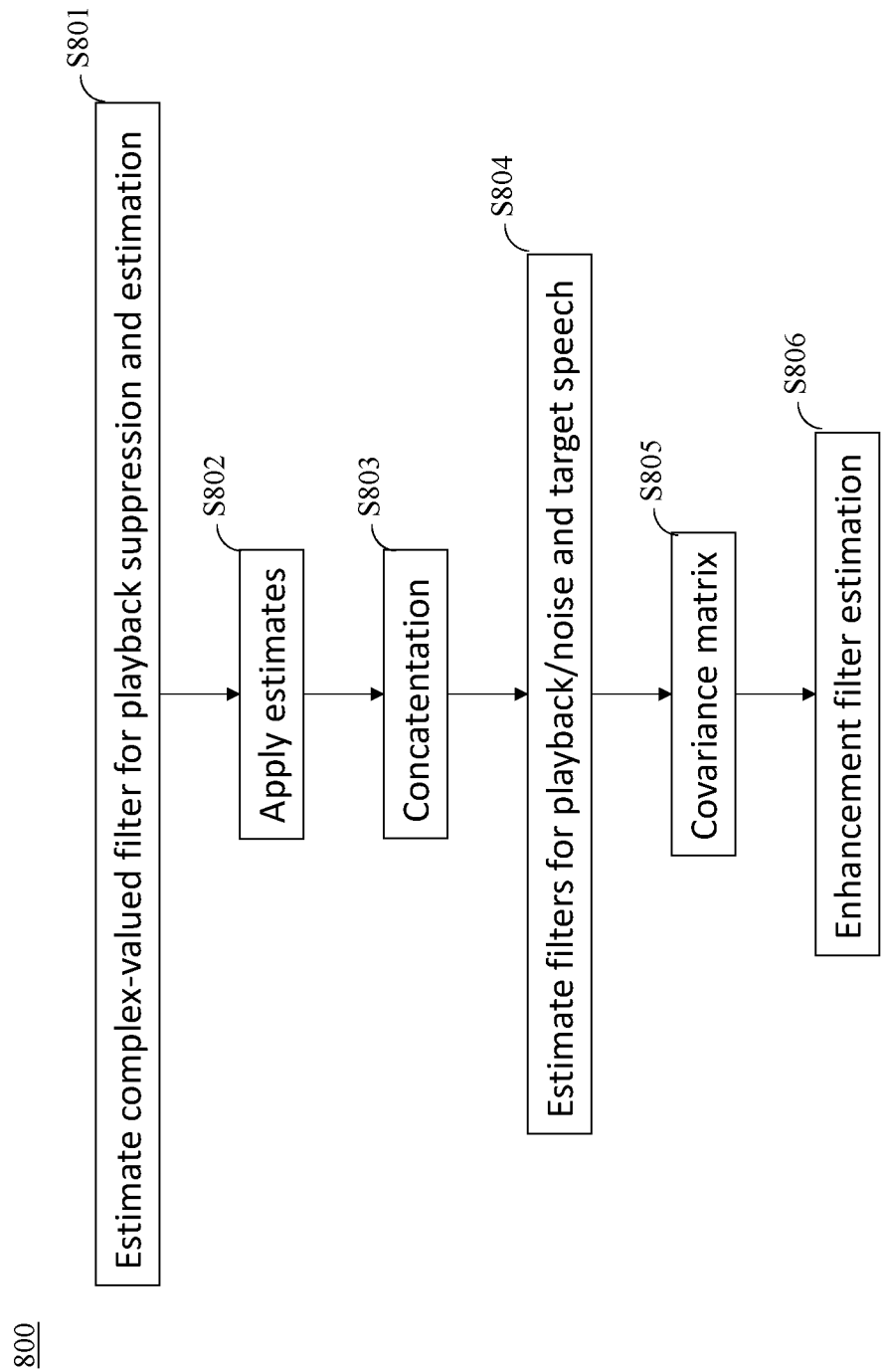
FIG. 8 is a simplified flow diagram in accordance with embodiments.

FIG. 8 illustrates a flowchart 800 regarding an architecture of Deep AHS for howling suppression according to embodiments of the disclosure. For example, as shown in example 700, the network consists of three parts, where the first part 701 employs a gated recurrent unit (GRU) layer with 257 hidden units and two 1D convolution layers to estimate a complex-valued filter for playback suppression and playback estimation, respectively, at S801. The estimates are then applied at S802 on the microphone signal Y to obtain the corresponding outputs, denoted as $\widehat{S+N}$ and $\hat{D}$.

The LPS of these outputs, together with the fused feature for the first part, are concatenated at S803 and fused to serve as the inputs for the second part 702. Another GRU layer and two 1D convolution layers are utilized to estimate two filters for estimating the playback/noise and target speech from input channels Y, $\widehat{S+N}$, and $\hat{D}$. The covariance matrix of playback/noise $\hat{\Phi}_{NN}$ and target speech $\hat{\Phi}_{SS}$ are then calculated at S806 for the third part 703.

The third part 703 is for enhancement filter estimation, which is motivated by the idea of multi-channel signal processing. Embodiments regard the input Y and two estimates $\widehat{S+N}$, and $\hat{D}$ as three-channel inputs and train a self-attentive RNN to estimate the speech enhancement filters $W \in \mathbb{C}^{F \times T \times 3}$. These filters are then applied on the input channels to get the enhanced target speech ŝ. Finally an inverse STFT (iSTFT) is used to get waveform ŝ(t).

The loss function for model training is defined as a combination of scale-invariance signal-to-distortion ratio (SI-SDR) in the time domain and mean absolute error (MAE) of spectrum magnitude in the frequency domain:

$$\text{Loss} = -SI\text{-}SDR(\hat{s}, s) + \lambda \, MAE(|\hat{S}|, |S|) \qquad \text{Eq. (5)}$$

where λ is set to 10,000 to balance the value range of the two losses.

Since there may always be a mismatch between the offline training and inference stage of Deep AHS. A streaming inference method, in which the output of the processor is looped back and added to the input in the following time steps, is therefore implemented to evaluate the performance of Deep AHS in a realistic and recurrent mode. Details of this streaming inference are shown in the example 900 of FIG. 9.

As such, embodiments of this disclosure provide for a deep learning approach to acoustic howling suppression. The embodiments address AHS by extracting the target signal from microphone recording using an attention based recurrent neural network with properly designed features. With the idea of teacher-forced learning, the Deep AHS model is trained offline using teacher signals and evaluated in both offline and streaming manners to show its performance for howling suppression.

The technical contribution of this disclosure is fourfold. Firstly, Deep AHS formulates howling suppression, an adaptive procedure, as a supervised learning problem with the help of teacher-forced learning. It is fundamentally different from traditional AHS methods and does not require howling detection. Secondly, with such a training strategy, a streaming inference method is implemented to evaluate the performance of Deep AHS in a recurrent manner. Thirdly, Deep AHS is robust to nonlinear distortions and can achieve howling and noise suppression jointly under different scenarios, which allows for higher loop gain and brings flexibility to the design of an audio system. Lastly, multiple training strategies have been investigated for howling suppression.

Embodiments of this disclosure regard acoustic howling suppression (AHS) as a supervised learning problem and employ a deep learning approach, called Deep AHS, to address it. Deep AHS is trained in a teacher forcing way which converts the recurrent howling suppression process into an instantaneous speech separation process to simplify the problem and accelerate the model training. The embodiments utilizes properly designed features and trains an attention based recurrent neural network to extract the target signal from the microphone recording, thus attenuating the playback signal that may lead to howling. Different training strategies are investigated and a streaming inference method implemented in a recurrent mode used to evaluate the performance of the proposed method for real-time howling suppression. Deep AHS avoids howling detection and intrinsically prohibits howling from happening, allowing for more flexibility in the design of audio systems. Experimental results show the effectiveness of the proposed method for howling suppression under different scenarios.

Figure 10:
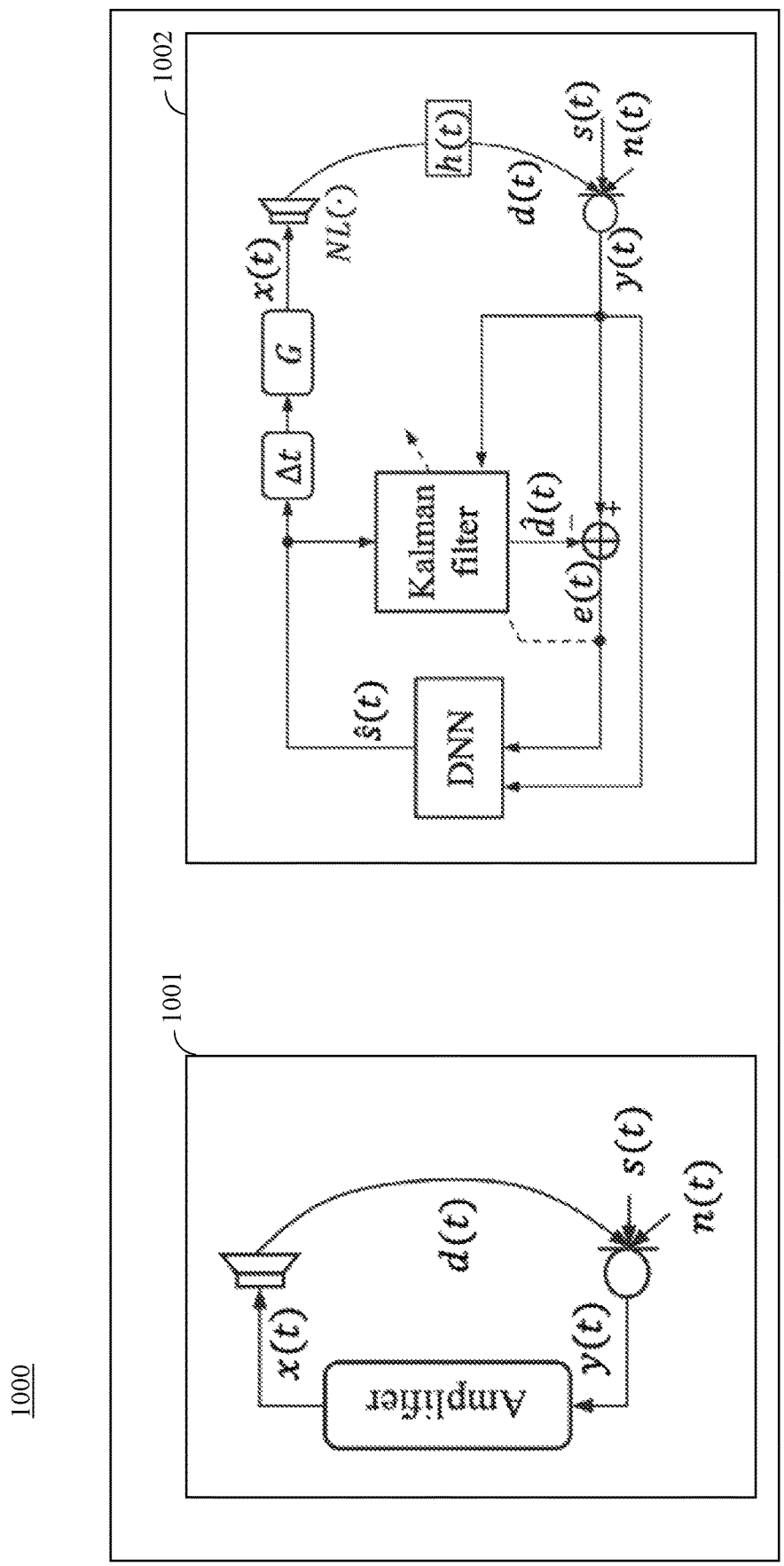
FIG. 10 is a simplified illustration in accordance with embodiments.

FIG. 10 is a signal diagram example 100 of an acoustic amplification system 1001 according to embodiments of the present disclosure.

As shown in FIG. 10, acoustic amplification system 1001 includes of a microphone and a loudspeaker where the target speech is picked up by the microphone as s(t), which is then sent to the loudspeaker for acoustic amplification. The loudspeaker signal x(t) is played out and arrives at the microphone as an acoustic feedback denoted as d(t):

$$d(t) = NL(x(t)) * h(t) \qquad \text{Eq. (6)}$$

where NL(.) denotes the nonlinear distortion introduced by the loudspeaker, h(t) represents the acoustic path from loudspeaker to microphone, and * denotes linear convolution.

When the signal is not processed, the playback signal d(t) will re-enter the pickup repeatedly, the corresponding microphone signal can then be represented as:

$$y(t) = s(t) + n(t) + NL[y(t - \Delta t) \cdot G] * h(t) \qquad \text{Eq. (7)}$$

where n(t) represents the background noise, Δt denotes the system delay from microphone to loudspeaker, and G the gain of amplifier. The recursive relationship between y(t) and y(t−Δt) causes re-amplifying of playback signal and leads to a feedback loop that results in an annoying, high-pitched sound, which is known as acoustic howling.

While acoustic howling and acoustic echo are two distinct phenomena, inappropriate handling of acoustic echo can result in howling. The primary differences between these two phenomena are (1) while both of them are fundamentally playback signals, howling is characterized by a gradual buildup of signal energy in a recursive manner and (2) the signal that leads to howling is generated by the same source as the target signal, making the suppression of howling more challenging.

According to an embodiment, suppressing howling may be achieved by incorporating the AHS method within the acoustic loop considering the recursive nature of howling. However, there may be some drawbacks of this embodiment—it may be computationally demanding and may be inefficient for deep learning based methods.

To address these challenges, embodiments of the present disclosure adopts a teacher-forcing training strategy to formulate AHS as a speech separation problem during model training.

FIG. 10 also illustrated an acoustic amplification system 1002 according to embodiments of the present disclosure for hybrid acoustic howling suppression based on a frequency filter model and a deep neural network.

According to this embodiment, the assumption is that the Hybrid AHS model, once properly trained, can attenuate interferences and transmit only the target speech to the loudspeaker, and consequently, the actual output $\widehat{s(t)}$ in FIG. 10 may be replaced with the ideal target (teacher signal) s(t) during model training, and the recursively defined microphone signal in Eqn (7) is converted into a mixture of target signal, background noise, and an one-time playback signal determined by s(t):

$$y(t) = s(t) + n(t) + NL[s(t - \Delta t) \cdot G] * h(t) \qquad \text{Eq. (8)}$$

Thus, the overall task of AHS is then transformed into a speech separation problem during offline training. The object is to extract the target signal s(t) from the ideal microphone signal, defined in Eqn (8) and exclusively employed for model training, using the Kalman filter output e(t) as an additional input, thus jointly suppressing howling and noise.

The Kalman filter model/module may utilize microphone signal y(t) and the enhanced signal ŝ(t) as a reference (denoted as r(t)) to obtain an estimate of the acoustic path ĥ(t) and the corresponding feedback d(t). The estimated feedback may then be subtracted from the microphone signal, and the resulting error signal e(t) may be employed for filter weight updating. The overall process may be viewed as a two-step procedure (prediction and updating) with Kalman filter weights updated through the iterative feedback from the two steps.

In the prediction step, the near-end signal is estimated as:

$$E(k) = Y(k) - R(k)\hat{H}(k) \qquad \text{Eq. (9)}$$

where E, Y, and R are the short-time Fourier transform (STFT) of e(t), y(t), and r(t) respectively, and k denotes the frame index. Ĥ(k) denotes the frequency-domain estimated echo path.

Figure 11:
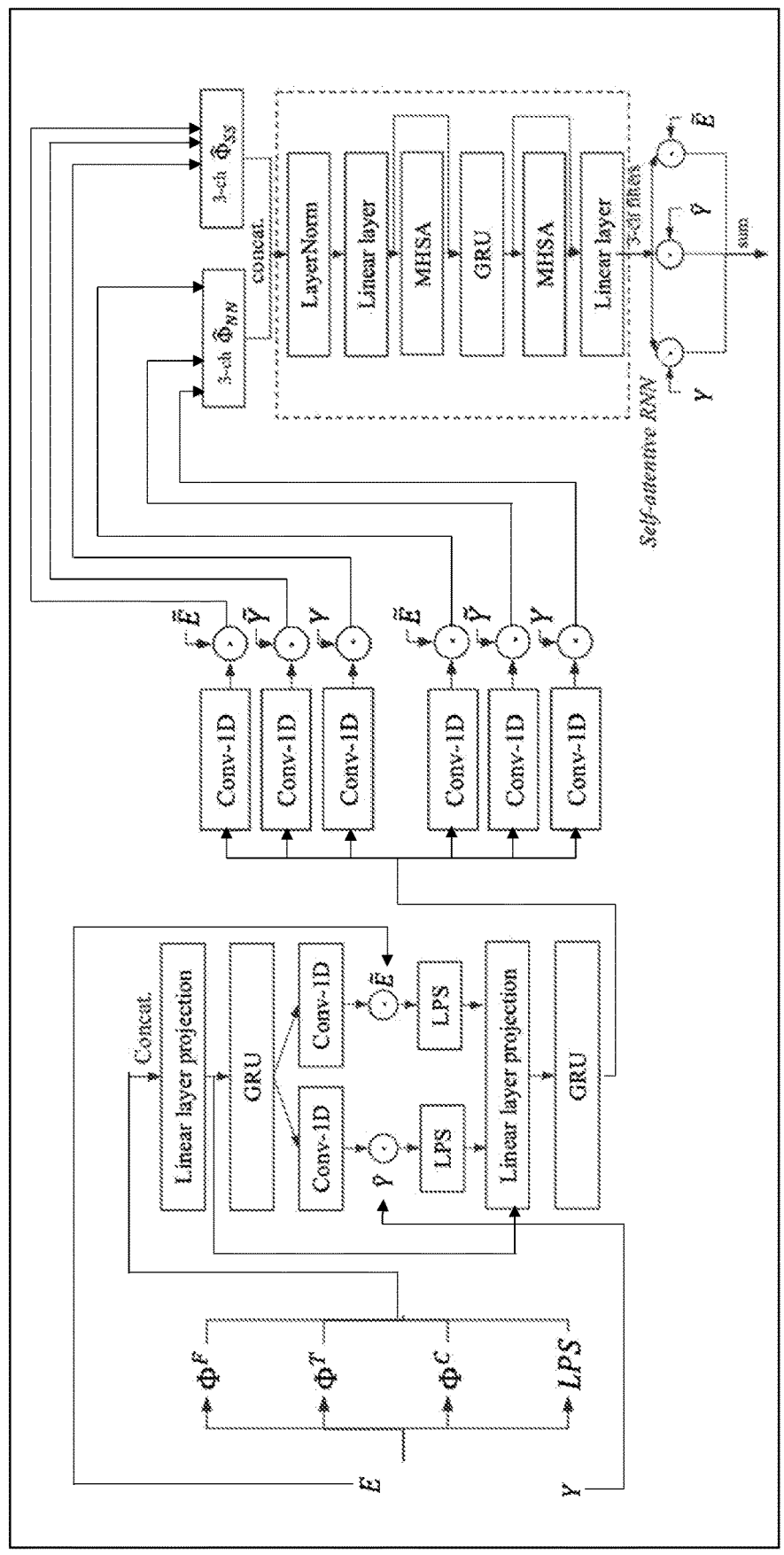
FIG. 11 is a simplified illustration in accordance with embodiments.

The echo path Ĥ(k) is updated in the updating step:

$$\hat{H}(k+1) = A[\hat{H}(k) + K(k)E(k)] \qquad \text{Eq. (10)}$$

where A is the transition factor. K(k) denotes the Kalman gain, which is obtained using covariances calculated from state estimation error, observation and process noises In the example 1100 of FIG. 11, a "Conv-1D" outputs a complex-valued ratio filter, which is then applied upon signal * through deep filtering, denoted as ⊙. The intermediate signals mentioned herein may be obtained by applying a filtering to the corresponding original inputs. Specifically, multiple Conv-1D layers may be applied to learn a complex-valued ratio filter and apply it upon the corresponding input signal through deep filtering. The LPS feature of these intermediate signals, together with the original feature may be used for training the following model. In addition, these intermediate signals may be used later for estimating multi-channel noise and speech covariance matrix, are then used for multi-channel deep filtering for obtaining an estimate of the target signal.

Acoustic howling is a phenomenon stems from positive feedback within the audio system itself, often caused by the amplified sound output from the loudspeaker being picked up by the microphone and subsequently re-amplified. This results in an uncontrolled positive feedback loop, leading to the undesirable amplification of specific frequency components and the generation of a sustained and unpleasant howling sound. It is commonly observed in systems like hearing aids, public addressing system, and karaoke. The presence of howling not only poses a threat to the functionality of the equipment but also poses potential risks to human hearing system. Acoustic howling suppression (AHS) refers to the process of reducing or eliminating the occurrence of acoustic howling.

Many methods have been proposed for acoustic howling suppression (AHS), including gain control, frequency shift, notch filter, and adaptive feedback cancellation (AFC) according to embodiments. Among them, the AFC method employs adaptive filters such as Kalman filter to estimate and cancel the howling signal by continuously updating filter coefficients based on the detected feedback, making them a powerful approach for AHS over other methods. However, AFC methods are sensitive to control parameters and inadequate in feedback systems with nonlinear distortions.

Acoustic howling is similar to acoustic echo since they both arise from feedback in communication systems and mishandling acoustic echo can lead to howling. Deep learning has demonstrated impressive performance in tackling acoustic echo problems and has recently emerged as a viable solution for addressing AHS tasks. A deep learning method may be introduced for howling detection. Two deep learning based AHS approaches, howling noise suppression and deepMFC may be implemented. However, these two methods have limitations as they are trained on microphone signals generated offline in a closed-loop system without having any AHS processing in it, introducing a mismatch problem during inference stage. Another approach called DeepAHS utilizes teacher-forcing learning has been implemented and exhibits superior performance compared to previous methods. HybridAHS, built upon the foundations of DeepAHS, further alleviates the mismatch and improves howling suppression by incorporating the output of a Kalman filter as an additional input.

Despite these advancements, the recurrent NN based AHS methods may have all been trained using offline generated signals and the mismatch between training and real-time inference limits the effectiveness of these methods.

To alleviate those technical deficiencies in the technology, embodiments herein introduce a novel method to tackle the challenge of mismatch and fully exploit the potential of deep learning in AHS. Embodiments adopt a new training paradigm, recursively training the NN module to establish consistency between training and inference stages and eliminate the mismatch problem. During the training stage, embodiments integrate the neural network (NN) module into the acoustic loop, generating signals online in a recursive manner. This training methodology circumvents the mismatch problem encountered in prior NN based AHS methods, leading to enhanced performance and improved robustness.

Figure 12:
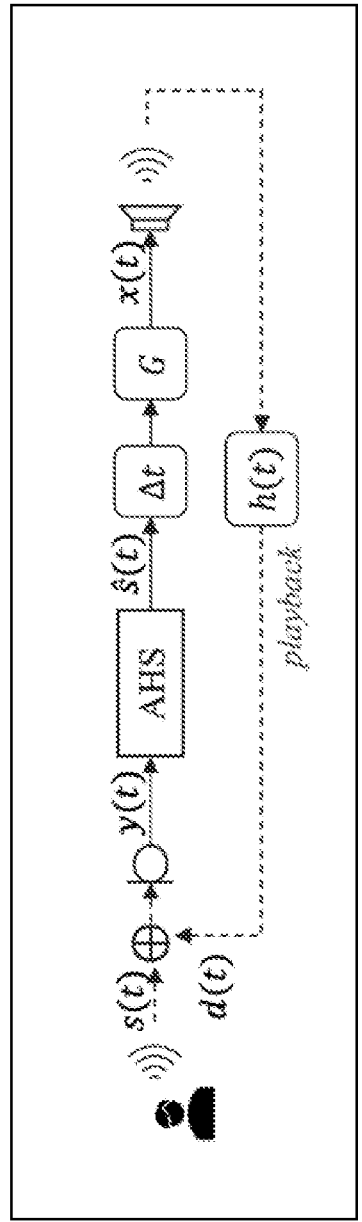
FIG. 12 is a simplified illustration in accordance with embodiments.

A typical single-channel acoustic amplification system is shown in the example 1200 of FIG. 12. It consists of a microphone and a loudspeaker where the target speech is picked up by the microphone as s(t), which is then sent to the loudspeaker for acoustic amplification. The loudspeaker signal x(t) is played out and arrives at the microphone as acoustic feedback denoted as d(t):

$$d(t) = x(t) * h(t) \qquad \text{Eq. (11)}$$

where h(t) represents the acoustic path from loudspeaker to microphone, and * denotes linear convolution.

Without any AHS processing, the loudspeaker signal x(t) will be an amplified version of the previous microphone signal y(t−Δt) and undergo repeated re-entry into the pickup, leading to the representation of the microphone signal as:

$$y(t) = s(t) + [y(t - \Delta t) \cdot G] * h(t) \qquad \text{Eq. (12)}$$

With proper howling suppression, the AHS module will output an estimate of the target signal and the corresponding microphone signal will be:

$$y(y) = s(t) + [\hat{s}(t - \Delta t) \cdot G] * h(t) \qquad \text{Eq. (13)}$$

where Δt denotes the system delay from microphone to loudspeaker, and G the gain of amplifier.

The recursive relationship between y(t) and y(t−Δt) and the possible leakage in ŝ(t−Δt) give rise to the re-amplification of the playback signal, creating a feedback loop that manifests as an unpleasant, high-pitched sound known as acoustic howling.

The recursive nature of acoustic howling poses challenges in generating suitable training signals, as the current input de-pends on the previous outputs. Previous NN-based methods address AHS by training models using offline-generated microphone signals. Howling noise suppression and Deep-MFC utilize the microphone signal generated without AHS for model training. DeepAHS and HybridAHS employ teacher forcing learning and assume perfect howling suppression, i.e., the microphone signals used for model training are generated by replacing s^(t) with s(t) in equation (13).

However, all these methods encounter a mismatch problem during the inference stage, as the real microphone signal received during inference are generated recursively using the processed microphone signal, described by equation (13), differs from the training signals.

Figure 13:
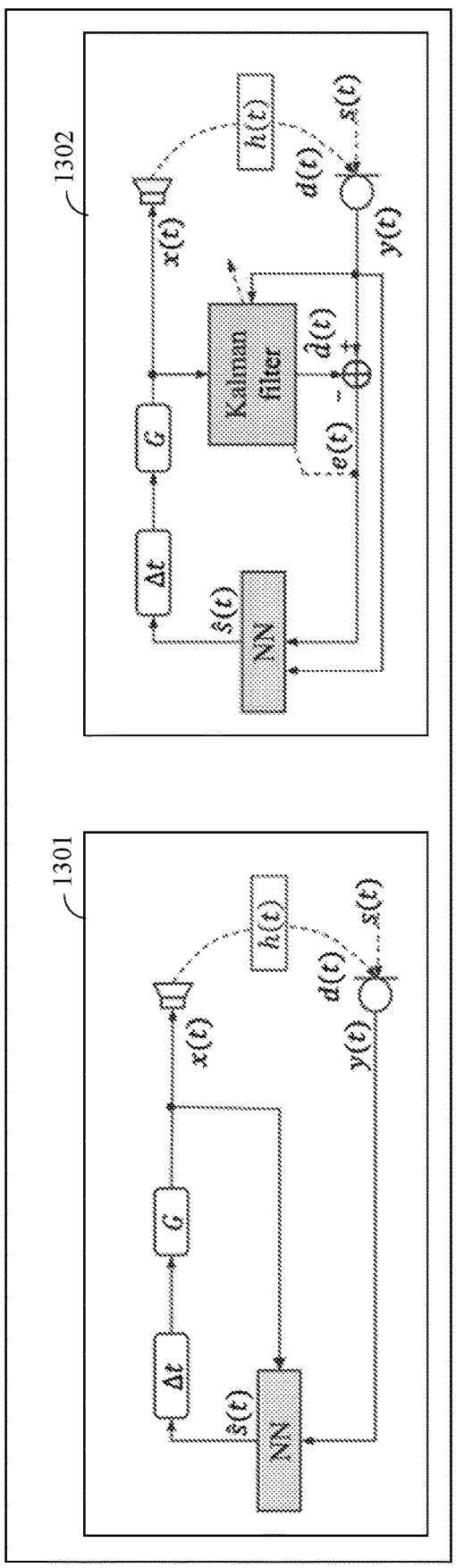
FIG. 13 is a simplified illustration in accordance with embodiments.

Therefore, according to embodiments, the recursive training approach is introduced to mitigate the mismatch problem and maintain consistency throughout training and inference. Here, input signals are generated recursively on the fly during model training where each processed frame serves as the input for the subsequent frame, preserving the inherent recursive nature of howling suppression. Motivated by prior studies, the inventors devised configurations within the disclosed approaches that employ solely NN, as in example 1301, and hybrid NN with a Kalman filter for AHS, as in example 1302, as shown in FIG. 13. According to embodiments, there is implementation in the frequency domain while employing time-domain labels in this figure to clarify signal relationships and improve comprehension. Further details of the proposed method are provided in example 1400 of FIG. 14, where NN(•) and K(•) represent the parameters of the NN and Kalman modules, respectively.

According to the examples 1301 and 1400, an NN only method takes frequency-domain microphone signal Ym and reference signal Rm as input to get an estimate of the target signal signal $\hat{S}_m$, as described in Algorithm 1:

$$\hat{S}_m = \mathbb{N}\mathbb{N}(Y_m, R_m) \qquad \text{Eq. (14)}$$

where m denotes the frame index, and the loudspeaker signal obtained in the previous frame $X_{m-1}$ is used as the reference signal.

Further, according to the examples 1302 and 1400, a hybrid approach combines NN with traditional Kalman filter, where the Kalman module addresses howling suppression by modeling the acoustic path with an adaptive filter and then subtracting the corresponding estimated playback signal $\hat{D}_m$, from microphone recording to get an error signal $E_m$:

$$\hat{D}_m = \mathbb{K}(Y_m, X_{m-1}) \qquad \text{Eq. (15)}$$

$$E_m = Y_m - \hat{D}_m \qquad \text{Eq. (16)}$$

The output of Kalman filter is then used as the reference signal for training the NN module in the hybrid method to get an estimate of the target speech:

$$\hat{S}_m = \mathbb{N}\mathbb{N}(Y_m, E_m) \qquad \text{Eq (17)}$$

The proposed hybrid method can be viewed as a recursive training adaptation of HybridAHS. Unlike HybridAHS, which uses pre-processed signals from the Kalman filter during offline training, embodiments herein integrate the NN module and Kalman filter within the closed-loop system for frame-by-frame processing. This approach capitalizes on the strengths of both modules while effectively addressing the mismatch problem in HybridAHS.

Viewing the example 1400, embodiments implement the NN module, illustrated in examples 1301 and 1302, using a small, deployable model for complex ratio mask (cRM) estimation. The input for model training is a concatenation of [Ym, Rm, Yr, Yi] and the training target is set as [Sr, Si], where Y, R, S denotes the frequency response of y, r, s, respectively, and *m, *r and *i the magnitude, real, and imaginary spectrograms. The model is a long short-term memory (LSTM) network that consists of two hidden layers with 300 units, resulting in 1.54 M trainable parameters. The frame size and frame shift are set to 8 ms and 4 ms, respectively. All the models are trained for 60 epochs using a batch size of 128.

According to embodiments, the NN module is updated using an utterance-level mean absolute error (MAE) of real and imaginary spectrograms as loss function:

$$\text{Loss} = MAE(\hat{S}_r, S_r) + MAE(\hat{S}_i, S_i) \qquad \text{Eq. (18)}$$

In light of the above, introducing the recursive training of NN for AHS poses challenges, particularly the difficulty in achieving convergence. The inherent recursive nature of howling generation can lead to signal accumulation and energy explosion, surpassing Python's maximum allowable value and triggering "not a number (NAN)" warnings, hindering gradient calculations and model updates. This issue is especially prominent during batch training, where one utterance's convergence failure affects the entire batch's loss value. Ensuring trainability is crucial, further exacerbated by improper AHS outputs and system divergence due to random NN parameter initialization. To address these challenges, embodiments may, according to exemplary embodiments, utilize two strategies: howling detection (HD) and initialization using pre-trained models.

For howling detection, an effective strategy is to integrate howling detection into the training process. During recursive training, embodiments continuously monitor the microphone signal for the presence of howling, identified by the amplitude of microphone signal consistently exceeding a threshold for 100 consecutive samples. Upon detection, further processing of the current utterance is halted, and only the already processed portion is used for loss calculation.

Excluding the howling signal from further processing and loss calculation prevents potential NAN issue and minimizes its impact on the convergence of the NN module.

For initialization using pre-trained models, embodiments enhance trainability and expediting training by utilizing a pre-trained offline model to initialize the NN parameters. Normally, the NN module's parameters are initialized randomly, which may not guarantee adequate howling suppression and can lead to severe howling and NAN warnings during the initial training phases. Despite the inevitable mismatches in the recursive inference scenarios, the offline pre-trained model still demonstrates superior howling suppression compared to randomly initialized NN modules.

Adopting pre-trained offline models for NN parameter initialization addresses the NAN issue and ensures the convergence of model training. This approach can be seen as a form of recursive fine-tuning of the offline model. According to embodiments, the pre-trained HybridAHS is employed for NN initialization.

Therefore, embodiments introduce a novel recursive training approach for NN-based Acoustic Howling Suppression (AHS) and provide at least three key facets.

Firstly, the recursive training method sidesteps the mismatch issue encountered in prior NN-based AHS methods. This advancement surpasses baseline techniques in howling suppression while upholding speech quality.

Secondly, the incorporation of the howling detection strategy and the initialization using an offline model showcases substantial enhancements in the trained model's convergence. These elements play pivotal roles in the success of our proposed recursive training method.

Lastly, embodiments herein are adaptable to both NN-only and hybrid implementations, presenting a robust and flexible framework for acoustic howling suppression.

Therefore, in this disclosure is provided a novel training framework designed to comprehensively address the acoustic howling issue by examining its fundamental formation process. This framework integrates a neural network (NN) module into the closed-loop system during training with signals generated recursively on the fly to closely mimic the streaming process of acoustic howling suppression (AHS). The recursive training strategy herein bridges the gap between training and real-world inference scenarios, marking a departure from previous NN-based methods that typically approach AHS as either noise suppression or acoustic echo cancellation. Within this framework, there is also disclosed two methodologies: one exclusively relying on NN and the other combining NN with the traditional Kalman filter. Additionally, embodiments also further provide strategies, including howling detection and initialization using pre-trained offline models, to bolster trainability and expedite the training process. Experimental results validate that this framework offers a substantial improvement over previous methodologies for acoustic howling suppression.

The techniques described above, can be implemented as computer software using computer-readable instructions and physically stored in one or more computer-readable media or by a specifically configured one or more hardware processors. For example, FIG. 15 shows a computer system 1500 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
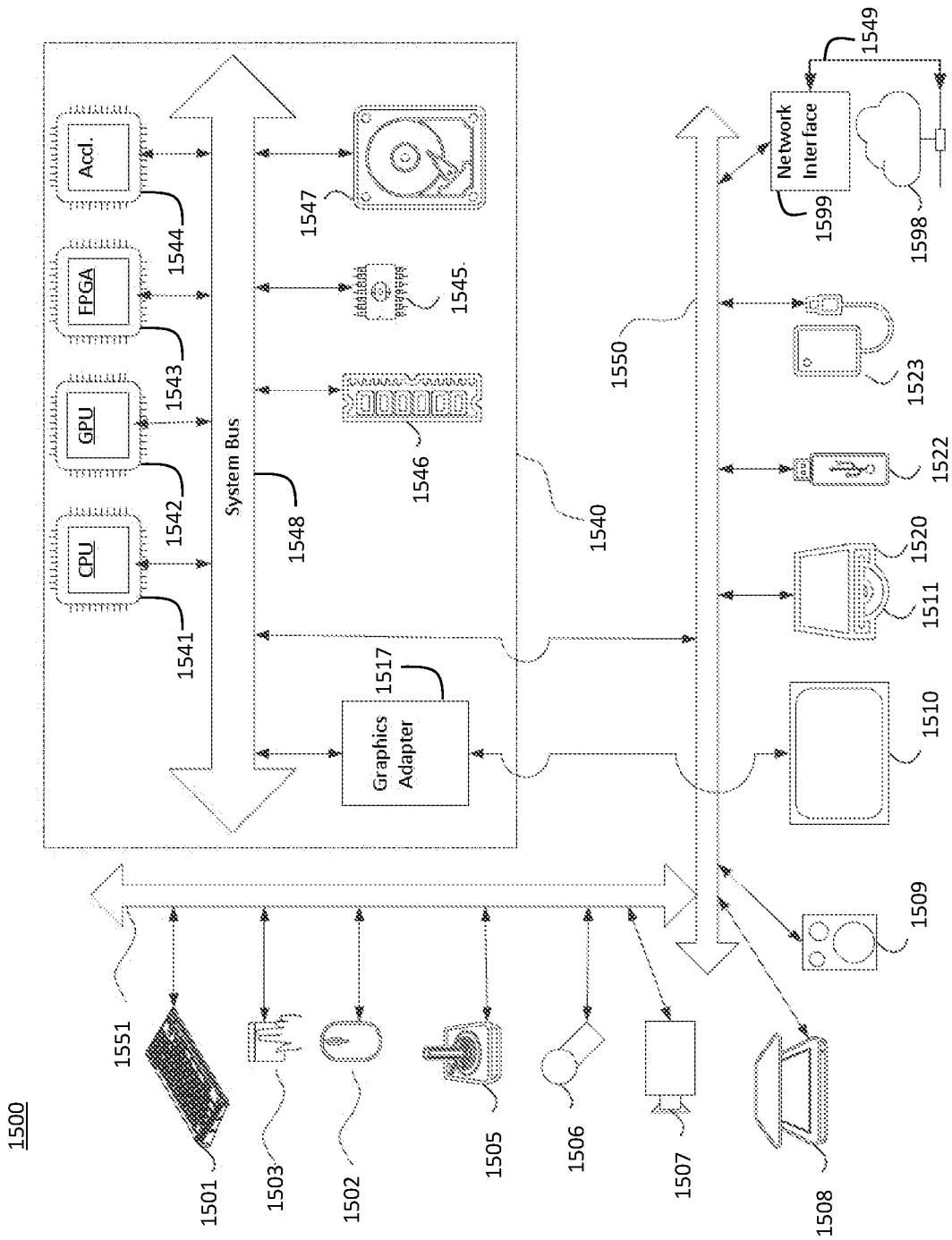
FIG. 15 is a simplified illustration in accordance with embodiments.

The components shown in FIG. 15 for computer system 1500 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1500.

Computer system 1500 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1501, mouse 1502, trackpad 1503, touch screen 1510, joystick 1505, microphone 1506, scanner 1508, camera 1507.

Computer system 1500 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1510, or joystick 1505, but there can also be tactile feedback devices that do not serve as input devices), audio output devices (such as: speakers 1509, headphones (not depicted)), visual output devices (such as screens 1510 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1500 can also include human accessible storage devices and their associated media such as optical media including CD/DVD ROM/RW 1520 with CD/DVD 1511 or the like media, thumb-drive 1522, removable hard drive or solid state drive 1523, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1500 can also include interface 1599 to one or more communication networks 1598. Networks 1598 can for example be wireless, wireline, optical. Networks 1598 can further be local, wide-area, metropolitan, vehicular and industrial, real-time, delay-tolerant, and so on. Examples of networks 1598 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1598 commonly require external network interface adapters that attached to certain general-purpose data ports or peripheral buses (1550 and 1551) (such as, for example USB ports of the computer system 1500; others are commonly integrated into the core of the computer system 1500 by attachment to a system bus as described below (for example Ethernet interface into a PC computer system or cellular network interface into a smartphone computer system). Using any of these networks 1598, computer system 1500 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1540 of the computer system 1500.

The core 1540 can include one or more Central Processing Units (CPU) 1541, Graphics Processing Units (GPU) 1542, a graphics adapter 1517, specialized programmable processing units in the form of Field Programmable Gate Areas (FPGA) 1543, hardware accelerators for certain tasks 1544, and so forth. These devices, along with Read-only memory (ROM) 1545, Random-access memory 1546, internal mass storage such as internal non-user accessible hard drives, SSDs, and the like 1547, may be connected through a system bus 1548. In some computer systems, the system bus 1548 can be accessible in the form of one or more physical plugs to enable extensions by additional CPUs, GPU, and the like. The peripheral devices can be attached either directly to the core's system bus 1548, or through a peripheral bus 1549. Architectures for a peripheral bus include PCI, USB, and the like.

CPUs 1541, GPUs 1542, FPGAs 1543, and accelerators 1544 can execute certain instructions that, in combination, can make up the aforementioned computer code. That computer code can be stored in ROM 1545 or RAM 1546. Transitional data can be also be stored in RAM 1546, whereas permanent data can be stored for example, in the internal mass storage 1547. Fast storage and retrieval to any of the memory devices can be enabled through the use of cache memory, that can be closely associated with one or more CPU 1541, GPU 1542, mass storage 1547, ROM 1545, RAM 1546, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1500, and specifically the core 1540 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1540 that are of non-transitory nature, such as core-internal mass storage 1547 or ROM 1545. The software implementing various embodiments of the present disclosure can be stored in such devices and executed by core 1540. A computer-readable medium can include one or more memory devices or chips, according to particular needs. The software can cause the core 1540 and specifically the processors therein (including CPU, GPU, FPGA, and the like) to execute particular processes or particular parts of particular processes described herein, including defining data structures stored in RAM 1546 and modifying such data structures according to the processes defined by the software. In addition or as an alternative, the computer system can provide functionality as a result of logic hardwired or otherwise embodied in a circuit (for example: accelerator 1544), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of acoustic howling suppression (AHS), the method performed by at least one processor and comprising:
   receiving an audio signal obtained from a microphone;
   inputting the audio signal into a neural-network based AHS model;
   training the neural-network based AHS model based on input signals which are recursively generated from the audio signal during training of the AHS model; and
   outputting an AHS signal from the neural-network based AHS model in which AHS is applied to the audio signal, wherein the AHS signal is a version of the audio signal in which acoustic howling noise of the audio signal is suppressed and target audio of the audio signal is sustained.

2. The method according to claim 1,
   wherein training the neural-network based AHS model comprises:
      obtaining the audio signal as a frequency-domain microphone signal;
      obtaining a reference signal; and
      estimating a target signal based on the audio signal and the reference signal.

3. The method according to claim 2, wherein the reference signal is an output of a Kalman filter.

4. The method according to claim 3,
   wherein training the neural-network based AHS model comprises generating the output of the Kalman filter during the training of the neural-network based model.

5. The method according to claim 1, wherein at least one of the input signals is based on an output of training the neural-network based AHS model based on a previous frame of the audio signal, and
   wherein training the neural-network based AHS model comprises training the neural-network based AHS model based on a combination of a current frame of the audio signal and the at least one of the input signals.

6. The method according to claim 5, wherein a frame size of each of the previous frame and the current frame is 8 ms of the audio signal.

7. The method according to claim 1, wherein at least one of the input signals comprises a combination of an output of a Kalman filter with a current frame of the audio signal, and
   the output of the Kalman filter is generated during training of the neural-network based AHS model.

8. The method according to claim 7, wherein the output of the Kalman filter is generated based on an output of the neural-network based AHS model depending on a previous frame of the audio signal, and
   wherein the previous frame is previous to the current frame.

9. The method according to claim 8, wherein training the neural-network based AHS model further comprises a second output of the neural-network based AHS model, being output from the neural-network based AHS model depending on the at least one of the input signals, being fed back to the Kalman filter, combined with at least a next frame of the audio signal, and fed back to the neural-network based AHS model.

10. The method according to claim 1, wherein training the neural-network based AHS model comprises updating the neural-network based AHS model using an utterance-level mean absolute error (MAE) of real and imaginary spectrograms as loss function.

11. An apparatus for acoustic howling suppression (AHS), the apparatus comprising:
at least one memory configured to store computer program code;
at least one processor configured to access the computer program code and operate as instructed by the computer program code, the computer program code including:
receiving code configured to cause the at least one processor to receive an audio signal obtained from a microphone;
inputting code configured to cause the at least one processor to input the audio signal into a neural-network based AHS model;
training code configured to cause the at least one processor to train the neural-network based AHS model based on input signals which are recursively generated from the audio signal during training of the AHS model; and
outputting code configured to cause the at least one processor to output an AHS signal from the neural-network based AHS model in which AHS is applied to the audio signal, wherein the AHS signal is a version of the audio signal in which acoustic howling noise of the audio signal is suppressed and target audio of the audio signal is sustained.

12. The apparatus according to claim 11,
wherein training the neural-network based AHS model comprises:
obtaining the audio signal as a frequency-domain microphone signal;
obtaining a reference signal; and
estimating a target signal based on the audio signal and the reference signal.

13. The apparatus according to claim 12, wherein the reference signal is an output of a Kalman filter.

14. The apparatus according to claim 13,
wherein training the neural-network based AHS model comprises generating the output of the Kalman filter during the training of the neural-network based model.

15. The apparatus according to claim 11, wherein at least one of the input signals is based on an output of training the neural-network based AHS model based on a previous frame of the audio signal, and
wherein training the neural-network based AHS model comprises training the neural-network based AHS model based on a combination of a current frame of the audio signal and the at least one of the input signals.

16. The apparatus according to claim 15, wherein a frame size of each of the previous frame and the current frame is 8 ms of the audio signal.

17. The apparatus according to claim 11, wherein at least one of the input signals comprises a combination of an output of a Kalman filter with a current frame of the audio signal, and
the output of the Kalman filter is generated during training of the neural-network based AHS model.

18. The apparatus according to claim 17, wherein the output of the Kalman filter is generated based on an output of the neural-network based AHS model depending on a previous frame of the audio signal, and
wherein the previous frame is previous to the current frame.

19. The apparatus according to claim 18, wherein training the neural-network based AHS model further comprises a second output of the neural-network based AHS model, being output from the neural-network based AHS model depending on the at least one of the input signals, being fed back to the Kalman filter, combined with at least a next frame of the audio signal, and fed back to the neural-network based AHS model.

20. A non-transitory computer readable medium storing a program causing a computer to:
receive an audio signal obtained from a microphone;
input the audio signal into a neural-network based AHS model;
train the neural-network based AHS model based on input signals which are recursively generated from the audio signal during training of the AHS model; and
output an AHS signal from the neural-network based AHS model in which AHS is applied to the audio signal, wherein the AHS signal is a version of the audio signal in which acoustic howling noise of the audio signal is suppressed and target audio of the audio signal is sustained.

* * * * *